(12) United States Patent
Yu

(10) Patent No.: US 12,533,632 B2
(45) Date of Patent: Jan. 27, 2026

(54) AMBIENT TEMPERATURE CATALYST FOR TRACE CONTAMINANT CONTROL WITH IMPROVEMENTS TO CARBON MONOXIDE AND HYDROGEN CAPTURE

(71) Applicant: Hamilton Sundstrand Corporation, Charlotte, NC (US)

(72) Inventor: Ping Yu, Simsbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 424 days.

(21) Appl. No.: 18/078,209

(22) Filed: Dec. 9, 2022

(65) Prior Publication Data
US 2024/0189770 A1    Jun. 13, 2024

(51) Int. Cl.
| | |
|---|---|
| *B01D 53/86* | (2006.01) |
| *B01J 21/18* | (2006.01) |
| *B01J 23/42* | (2006.01) |
| *B01J 35/40* | (2024.01) |
| *B01J 37/00* | (2006.01) |
| *B01J 37/02* | (2006.01) |
| *B01J 37/06* | (2006.01) |
| *B01J 37/08* | (2006.01) |

(52) U.S. Cl.
CPC ........... *B01D 53/864* (2013.01); *B01J 21/18* (2013.01); *B01J 23/42* (2013.01); *B01J 35/40* (2024.01); *B01J 37/0036* (2013.01); *B01J 37/009* (2013.01); *B01J 37/0236* (2013.01); *B01J 37/06* (2013.01); *B01J 37/08* (2013.01); *B01D 2255/1021* (2013.01); *B01D 2255/702* (2013.01); *B01D 2255/92* (2013.01); *B01D 2257/108* (2013.01); *B01D 2257/502* (2013.01); *B01D 2258/06* (2013.01)

(58) Field of Classification Search
CPC .......... B01D 53/864; B01D 2255/1021; B01D 2255/702; B01D 2255/92; B01D 2257/108; B01D 2257/502; B01D 2258/06; B01J 35/40; B01J 21/18; B01J 23/42; B01J 37/0036; B01J 37/0236; B01J 37/06; B01J 37/08
USPC ........... 502/185; 209/3, 10, 11, 659; 451/28, 451/87, 88; 23/314; 423/460, 246–248; 241/23, 24.11, 24.31, 68–70, 79.2
See application file for complete search history.

(56) References Cited

U.S. PATENT DOCUMENTS

| | | | |
|---|---|---|---|
| 3,658,724 A * | 4/1972 | Stiles | ................... B01J 37/0236 502/185 |
| 4,003,979 A | 1/1977 | Kanno | |
| 4,463,104 A | 7/1984 | Antos et al. | |
| 5,700,436 A | 12/1997 | Doughty et al. | |
| 6,093,670 A | 7/2000 | Brown | |
| 2015/0060365 A1 | 3/2015 | Widirstky et al. | |
| 2015/0321187 A1 * | 11/2015 | Dias | ......................... B01J 23/52 502/180 |

FOREIGN PATENT DOCUMENTS

| | | | | |
|---|---|---|---|---|
| EP | 4400211 A1 * | 7/2024 | ........... | B01D 53/864 |
| JP | S52104492 A | 9/1977 | | |
| JP | 4136318 B2 | 6/2008 | | |
| RU | 2366694 C2 | 9/2009 | | |
| WO | WO-2006071859 A2 * | 7/2006 | ............. | B02C 23/08 |

OTHER PUBLICATIONS

Yu et al., "Power and vol. Savings Through Incorporation of Low Temperature Catalytic Oxidation of H2 and CO for Submarines", SAMAP 2017, pp. 1-25.
European Search Report for Application No. 23211255.7, mailed Jun. 17, 2024, 11 pages.
Machine Translation for JP4136318 (B2), Published: Aug. 20, 2008, 9 pages.
Machine Translation for JPS52104492 (A), Published: Sep. 1, 1977, 5 pages.
Machine Translation for RU2366694 (C2); Published Sep. 10, 2009, 8 pages.
Nalette, Timothy, "CO Oxidation in Catalytic Hollow Fibres and Granular Catalysts: A Comparative Investigation of Catalyst Effectiveness", Mar. 9, 2011, pp. 1-221, Retrieved from the Internet: HTTPS://researchportal.bath.ac.uk/files/213126504/Tim_Nalette_PhD_Thesis_pdf [retrieved on Jun. 3, 2024].

* cited by examiner

*Primary Examiner* — Patricia L. Hailey
(74) *Attorney, Agent, or Firm* — CANTOR COLBURN LLP

(57) ABSTRACT

The present disclosure provides for ambient temperature catalyst compositions for trace contaminant control (e.g., for environmental control assemblies for space systems) and related methods of fabrication and use. More particularly, the present disclosure provides for ambient temperature catalytic oxidation (ATCO) catalyst compositions for trace contaminant control with improvements to carbon monoxide and hydrogen capture, and related methods of fabrication and use.

18 Claims, 3 Drawing Sheets

AMBIENT TEMPERATURE CATALYST FOR TRACE CONTAMINANT CONTROL WITH IMPROVEMENTS TO CARBON MONOXIDE AND HYDROGEN CAPTURE

TECHNICAL FIELD

The present disclosure relates to ambient temperature catalyst compositions for trace contaminant control (e.g., for environmental control assemblies for space systems) and related methods of fabrication and use.

BACKGROUND

In general, some ambient temperature catalyst compositions for trace contaminant control are known. For example, some ambient temperature catalyst compositions for trace contaminant control of environmental control systems are not efficient for carbon monoxide and hydrogen capture.

BRIEF DESCRIPTION

The present disclosure provides for ambient temperature catalyst compositions for trace contaminant control (e.g., for environmental control assemblies for space systems) and related methods of fabrication and use. More particularly, the present disclosure provides for ambient temperature catalytic oxidation (ATCO) catalyst compositions for trace contaminant control with improvements to carbon monoxide and hydrogen capture, and related methods of fabrication and use.

The present disclosure provides for a method for fabricating an ambient temperature catalytic oxidation catalyst composition including loading 4×8 US mesh granular activated carbon material into a rotating cylinder abrasimeter and subjecting the 4×8 US mesh granular activated carbon material to abrasion via the abrasimeter; screening the abraded granular activated carbon material with a 6 US mesh screen; washing the screened granular activated carbon material with water, and then drying the screened granular activated carbon material in a heating oven; further screening the dried granular activated carbon material with a 6 US mesh screen to produce a 4×6 US mesh granular activated carbon material; loading the 4×6 US mesh granular activated carbon material into a container, and adding a solution of chloroplatinic acid to the 4×6 US mesh granular activated carbon material; loading the container into a rotary evaporator, and rotating the rotary evaporator to remove water from the container; and removing the 4×6 US mesh granular activated carbon material from the container and heating the 4×6 US mesh granular activated carbon material in an oven to produce a platinum on the 4×6 US mesh granular activated carbon material catalyst composition.

In addition to one or more of the features described, or as an alternative to any of the foregoing embodiments, the granular activated carbon is coconut granular activated carbon.

In addition to one or more of the features described, or as an alternative to any of the foregoing embodiments, the coconut granular activated carbon is fabricated from grades of coconut shell.

In addition to one or more of the features described, or as an alternative to any of the foregoing embodiments, the platinum on the 4×6 US mesh granular activated carbon material catalyst composition is a 10% platinum on the 4×6 US mesh granular activated carbon material catalyst composition.

In addition to one or more of the features described, or as an alternative to any of the foregoing embodiments, the 4×8 US mesh granular activated carbon material is subjected to abrasion at 90 cycles per minute for about four hours.

In addition to one or more of the features described, or as an alternative to any of the foregoing embodiments, wherein washing the screened granular activated carbon material includes first washing the screened granular activated carbon material with tap water until a supernatant water is clear, and then washing the screened granular activated carbon material with deionized water.

In addition to one or more of the features described, or as an alternative to any of the foregoing embodiments, wherein after washing the screened granular activated carbon material with water, the water is drained from the screened granular activated carbon material prior to drying.

In addition to one or more of the features described, or as an alternative to any of the foregoing embodiments, wherein drying the screened granular activated carbon material in a heating oven includes heating at 90° C. for about three hours, and then heating at 150° C. for about three hours.

In addition to one or more of the features described, or as an alternative to any of the foregoing embodiments, wherein prior to further screening the dried granular activated carbon material, the dried granular activated carbon material is cooled to ambient temperature.

In addition to one or more of the features described, or as an alternative to any of the foregoing embodiments, wherein adding the solution of chloroplatinic acid to the 4×6 US mesh granular activated carbon material includes dripping the solution of chloroplatinic acid to the 4×6 US mesh granular activated carbon material.

In addition to one or more of the features described, or as an alternative to any of the foregoing embodiments, wherein loading the container into the rotary evaporator includes positioning a portion of the container in a hot water bath.

In addition to one or more of the features described, or as an alternative to any of the foregoing embodiments, wherein rotating the rotary evaporator to remove water from the container includes rotating the container for about five minutes while cooling water is turned on to condense water vapor.

In addition to one or more of the features described, or as an alternative to any of the foregoing embodiments, wherein rotating the rotary evaporator to remove water from the container includes turning on and providing a vacuum to the rotary evaporator.

In addition to one or more of the features described, or as an alternative to any of the foregoing embodiments, wherein heating the 4×6 US mesh granular activated carbon material in the oven includes heating in the oven at 250° C. for about four hours.

In addition to one or more of the features described, or as an alternative to any of the foregoing embodiments, further including utilizing the produced platinum on the 4×6 US mesh granular activated carbon material catalyst composition as an ambient temperature catalytic oxidation catalyst composition in a trace contaminant control assembly to remove at least one contaminant from an environment.

In addition to one or more of the features described, or as an alternative to any of the foregoing embodiments, wherein the at least one contaminant is hydrogen or carbon monoxide.

In addition to one or more of the features described, or as an alternative to any of the foregoing embodiments, wherein the trace contaminant control assembly is an environmental control assembly for a space system.

The present disclosure provides for an ambient temperature catalytic oxidation catalyst composition fabricated by the disclosed methods.

The above described and other features are exemplified by the following figures and detailed description.

Any combination or permutation of embodiments is envisioned. Additional features, functions and applications of the disclosed systems, assemblies and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

The following figures are example embodiments wherein the like elements are numbered alike.

Features and aspects of embodiments are described below with reference to the accompanying drawings, in which elements are not necessarily depicted to scale.

Figure 1:
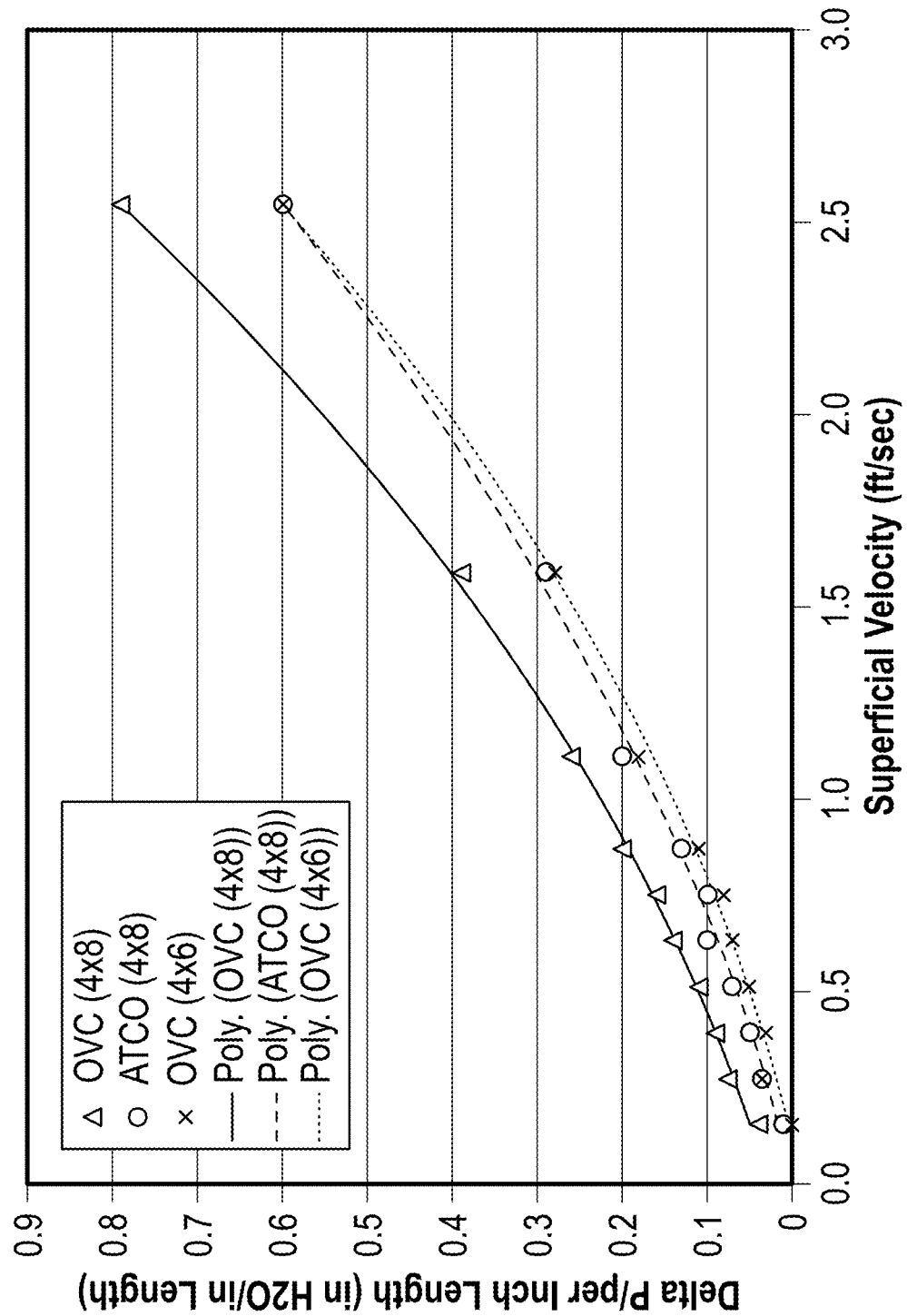
Figure 2:
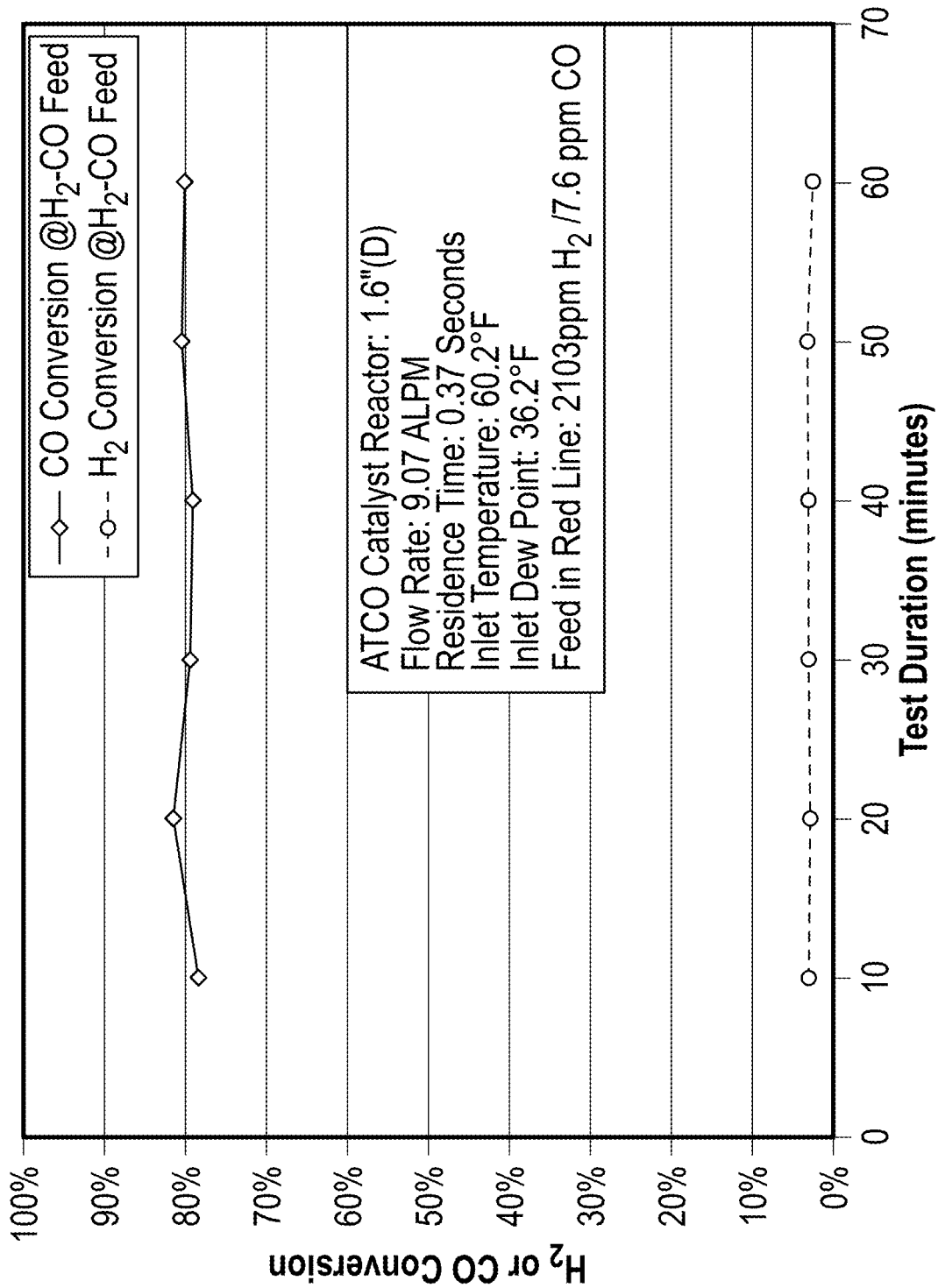
Figure 3:
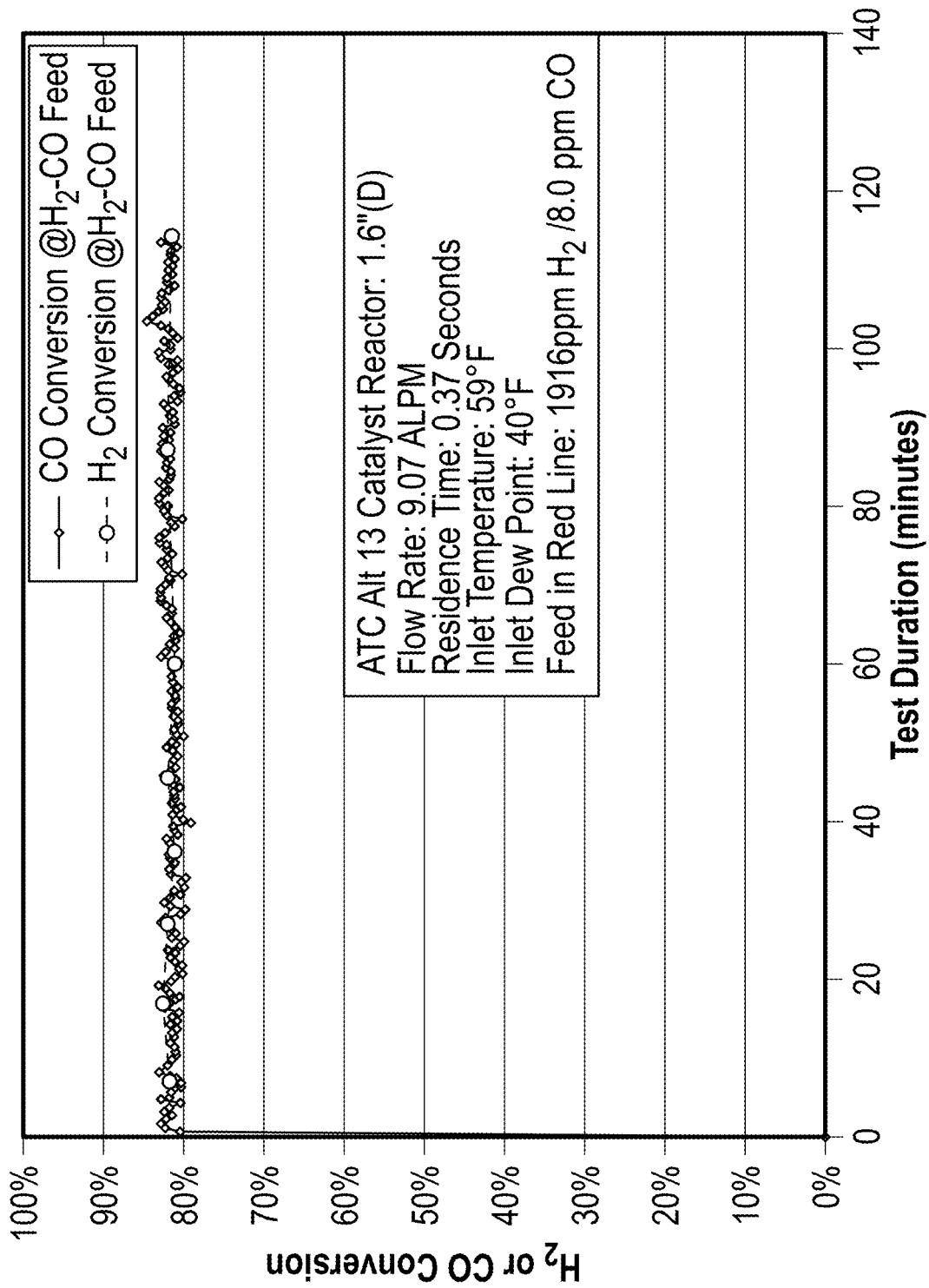

Example embodiments of the present disclosure are further described with reference to the appended figures. It is to be noted that the various features, steps, and combinations of features/steps described below and illustrated in the figures can be arranged and organized differently to result in embodiments which are still within the scope of the present disclosure. To assist those of ordinary skill in the art in making and using the disclosed systems, assemblies and methods, reference is made to the appended figures, wherein:

FIG. 1 is a graph showing pressure drops of (i) the example OVC (4×6) ATCO catalyst composition, and (ii) the example OVC (4×8) ATCO catalyst composition, and (iii) the comparative ATCO catalyst composition, at various flow rates;

FIG. 2 is a graph that illustrates the $H_2$ or CO conversions at the listed test conditions for the comparative ATCO catalyst composition; and FIG. 3 is a illustrates the H2 or CO conversions at the listed test conditions for the example OVC (4×6) ATCO catalyst composition.

DETAILED DESCRIPTION

The example embodiments disclosed herein are illustrative of ambient temperature catalyst compositions, and related methods of fabrication and use. It should be understood, however, that the disclosed embodiments are merely examples of the present disclosure, which may be embodied in various forms. Therefore, details disclosed herein with reference to example ambient temperature catalyst compositions and associated processes/techniques of fabrication/assembly and use are not to be interpreted as limiting, but merely as the basis for teaching one skilled in the art how to make and use the ambient temperature catalyst compositions of the present disclosure.

The present disclosure provides for ambient temperature catalyst compositions for trace contaminant control (e.g., for environmental control assemblies for space systems) and related methods of fabrication and use. More particularly, the present disclosure provides for ambient temperature catalytic oxidation (ATCO) catalyst compositions for trace contaminant control with improvements to carbon monoxide and hydrogen capture, and related methods of fabrication and use. In example embodiments, ambient temperature is less than 100° F. (less than 38° C.).

In general, the present disclosure provides ambient temperature catalyst compositions for trace contaminant assemblies/systems to remove low molecular volatiles (e.g., hydrogen, carbon monoxide, etc.).

As discussed further below, the present disclosure provides ambient temperature catalyst compositions for trace contaminant control for a trace contaminant control assembly. In example embodiments, the trace contaminant control assembly should remove hydrogen at a rate of 168.0 milligrams per day, with a maximum allowable concentration (and therefore a maximum assembly inlet concentration) of 170 milligrams per cubic meter. To verify hydrogen and carbon monoxide removal efficiency of the ambient temperature catalytic oxidation catalyst compositions, tests were conducted in a subscale axial fixed-bed reactor at various process parameters.

As discussed further below, some results indicate that the $H_2$ removal efficiency of an example ATCO catalyst composition (OVC (4×6) ATCO catalyst composition) of the present disclosure was about 80%, significantly higher than a comparative ATCO catalyst composition of 3.5%, and their CO (carbon monoxide) efficiencies were very comparable. The comparative ATCO catalyst composition was 2% platinum on 4×8 US mesh granular activated carbon (ATCO (4×8)).

The example OVC (4×6) ATCO catalyst composition was a 10% platinum on 4×6 US mesh granular activated carbon, fabricated via example methods of the present disclosure. As discussed further below, an example OVC (4×8) ATCO catalyst composition was a 10% platinum on 4×8 US mesh granular activated carbon, fabricated via other example methods of the present disclosure.

The pressure drop and crush strength mechanical parameters of the example OVC (4×6) ATCO catalyst composition and the example OVC (4×8) ATCO catalyst composition were tested relative to the comparative ATCO catalyst composition.

FIG. 1 is a graph showing pressure drops of (i) the example OVC (4×6) ATCO catalyst composition, and (ii) the example OVC (4×8) ATCO catalyst composition, and (iii) the comparative ATCO catalyst composition (ATCO (4×8)), at various flow rates.

The example OVC (4×6) ATCO catalyst composition, the example OVC (4×8) ATCO catalyst composition, and the comparative ATCO catalyst composition (ATCO (4×8)) were tested in a pressure drop test set-up at various flow rates (various superficial velocities). As shown in FIG. 1, the pressure drop (Delta P) of the example OVC (4×6) ATCO catalyst composition was comparable to the comparative ATCO catalyst composition (ATCO (4×8)).

The crush strengths of the example OVC (4×6) ATCO catalyst composition and the comparative ATCO catalyst composition were evaluated using a CRUSH-BK500 tester per ASTM D7084-4.

Table 1 below summarizes the test data. The crush strength of the example OVC (4×6) ATCO catalyst composition was 101 lb/in$^2$, which was about two times that of the comparative ATCO catalyst composition (52.46 lb/in$^2$).

TABLE 1

Crush Strength Test Data

| start weight grams | volume cc | fine grams | % fine | force (N) new tons | force (lbf) | force (lbf/in2) |
|---|---|---|---|---|---|---|
| ATCO(4 × 8) 12 mesh screen | | | | | | |
| 24.27 | 50 | 0.41 | 1.69% | 904 | 203.2 | 67.74 |
| 24.32 | 50 | 0.97 | 3.99% | 1476 | 331.8 | 110.60 |
| 24.93 | 49 | 1.72 | 6.90% | 2308 | 518.8 | 172.95 |
| | | | 1.00% | | | 52.46 |
| OVC(4 × 6) | | | | | | |
| 22.61 | 50 | 0.37 | 1.64% | 1515 | 340.6 | 113.52 |
| 23.04 | 49 | 1.15 | 4.99% | 2630 | 591.2 | 197.07 |
| 23.49 | 50 | 2.09 | 8.90% | 3717 | 835.6 | 278.53 |
| | | | 1.00% | | | 101.71 |

As noted above, the present disclosure provides ambient temperature catalyst compositions for trace contaminant assemblies/systems to remove low molecular volatiles (e.g., hydrogen, carbon monoxide, etc.). Table 2 below shows some important example requirements for example ATCO catalyst compositions of the present disclosure.

TABLE 2

Performance criteria for example ATCO catalyst compositions

| Condition Set ID | Bed Length (inch) | Residence Time (second) | Inlet Temperature (F.) | Inlet Dew Point (F.) | $H_2$ Concentration (ppm) | CO Concentration (ppm) | $H_2$ Efficiency Requirement % | CO Efficiency Requirement % |
|---|---|---|---|---|---|---|---|---|
| 1 | 1.87 | 0.367 | 61 | 40.5 | 2000 | 7.3 | 1.3 | 12 |

The $H_2$ and CO removal performances of the example OVC (4×6) ATCO catalyst composition and the comparative ATCO catalyst composition were evaluated using an ATCO subscale reactor. A Teflon cylindrical reactor with a dimension of 1.6 inch inner diameter (I.D.) and 7 inch depth was used as the subscale reactor for testing. The packed length of ATCO catalyst bed was 1.87 inches, and the remainder void was filled with glass beads.

Premixed hydrogen and carbon monoxide with humidified air (by flowing through gas bubbler) was fed to the ATCO subscale reactor. A heat exchanger and water chiller with recirculating water were used to chill inlet gas to below ambient temperature. A gas pipeline was wrap-insulated to maintain the temperature and also to avoid water condensation. Pre-mixed gas was initially by-passed from the reactor and fed directly to instruments for inlet gas concentration analysis. GOW-MAC 580 gas chromatography with a thermal conductivity detector (TCD) and Horiba via-510 CO analyzer were used for determining hydrogen and carbon monoxide gas concentrations, respectively. A first gas cylinder (0.2 $H_2/N_2$) was used for calibrating the gas chromatography (GC), and a second gas cylinder (50 ppm $CO/N_2$) was used for CO analyzer calibration. Each test started after a feed concentration of 2000 ppm for hydrogen and 7.6 ppm for carbon monoxide were verified at the flow rate settings and the tests terminated after the effluent concentrations leveled off for about one hour. Data of test duration, temperature, mass flow rate, dew point, and carbon monoxide concentration were acquired automatically every 0.5 seconds, while effluent hydrogen concentrations were manually analyzed every 6 to 10 minutes.

FIG. 2 illustrates the $H_2$ or CO conversions at the listed test conditions for the comparative ATCO catalyst composition.

FIG. 3 illustrates the $H_2$ or CO conversions at the listed test conditions for the example OVC (4×6) ATCO catalyst composition.

As shown in FIGS. 2 and 3, the CO performances of the comparative ATCO catalyst composition and the example OVC (4×6) ATCO catalyst composition are very comparable, around 80% efficiency. However, the $H_2$ conversion performance of the example OVC (4×6) ATCO catalyst composition was about 80%, significantly higher than the comparative ATCO catalyst composition of only 3.5%.

In example embodiments, the example OVC (4×6) ATCO catalyst composition was fabricated as described below.

OVC 4×8 (mesh) coconut granular activated carbon was provided (CalgonCarbon). The OVC 4×8 coconut granular activated carbon was fabricated from grades of coconut shell.

About 600 cubic centimeters of the OVC 4×8 coconut granular activated carbon OVC was loaded to a ROTAB-AS/S rotating abrasimeter for abrasion at 90 cycles per minute (cpm) for a total of about four hours.

Thereafter, the OVC carbon material after abrasion was unloaded from the abrasimeter, and dust and the like was screened out from the OVC carbon material with a 6 US mesh metal screen.

Then, the OVC carbon material was initially washed with tap water until the supernatant water was clear. Then, the OVC carbon material had a final wash with deionized (DI) water.

The water was then drained out from the OVC carbon material, and then spread over a Pyrex dish, and then put in a heating oven at 90° C. to dry for about three hours, and then at 150° C. for another three hours. The OVC carbon material was then cooled down to ambient temperature.

The OVC carbon material was then further screened through a 6 US mesh metal screen. After this further screening, the OVC carbon material was a dry 4×6 mesh carbon material.

Thereafter, about 250 cubic centimeters (cc) of the OVC dry 4×6 mesh carbon material was weighed, and the mass of chloroplatinic acid (CPA—also named hexachloroplatinic acid) solution (20% Pt mass) needed to make 10% Pt on the OVC dry 4×6 mesh carbon material was calculated (e.g., a 10% platinum on 4×6 mesh granular activated carbon material).

The about 250 cubic centimeters of the OVC dry 4×6 mesh carbon material was loaded into a container (e.g., 400 cc flask), and then the CPA solution was slowly added/dripped onto the carbon material. The container was then shook/rotated clockwise to ensure well mixing.

The container was then loaded into a rotary evaporator with about half of the container immersed in a pre-set hot water bath. The container was then rotated for about five minutes while cooling water was turned on to condense water vapor. Then, a vacuum was turned on and the container continued to rotate in the hot water bath to remove water from the Pt/carbon material until substantially no condensed water was observed from the water collector container, thereby completing this "wash coat" process of the Pt/carbon material.

The Pt/carbon material was then loaded a container (Pyrex dish), and then heated in an oven at 250° C. for about four hours. Thereafter, the Pt/carbon material was cooled (e.g., to ambient or room temperature).

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Unless specified to the contrary herein, all test standards are the most recent standard in effect as of the filing date of this application, or, if priority is claimed, the filing date of the earliest priority application in which the test standard appears.

Although the systems and methods of the present disclosure have been described with reference to example embodiments thereof, the present disclosure is not limited to such example embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A method for fabricating an ambient temperature catalytic oxidation catalyst composition comprising:
    loading mesh granular activated carbon material into a rotating cylinder abrasimeter and subjecting the mesh granular activated carbon material to abrasion via the abrasimeter;
    screening the abraded granular activated carbon material with a 6 US mesh screen;
    washing the screened granular activated carbon material with water, and then drying the screened granular activated carbon material in a heating oven;
    further screening the dried granular activated carbon material with a 6 US mesh screen to produce a 4×6 US mesh granular activated carbon material;
    loading the 4×6 US mesh granular activated carbon material into a container, and adding a solution of chloroplatinic acid to the 4×6 US mesh granular activated carbon material;
    loading the container into a rotary evaporator, and rotating the rotary evaporator to remove water from the container;
    removing the 4×6 US mesh granular activated carbon material from the container and heating the 4×6 US mesh granular activated carbon material in an oven to produce a platinum on the 4×6 US mesh granular activated carbon material catalyst composition.

2. The method of claim 1, wherein the granular activated carbon is coconut granular activated carbon.

3. The method of claim 1, wherein the coconut granular activated carbon is fabricated from grades of coconut shell.

4. The method of claim 1, wherein the platinum on the 4×6 US mesh granular activated carbon material catalyst composition is a 10% platinum on the 4×6 US mesh granular activated carbon material catalyst composition.

5. The method of claim 1, wherein the mesh granular activated carbon material is subjected to abrasion at 90 cycles per minute for about four hours.

6. The method of claim 1, wherein washing the screened granular activated carbon material comprises first washing the screened granular activated carbon material with tap water until a supernatant water is clear, and then washing the screened granular activated carbon material with deionized water.

7. The method of claim 1, wherein after washing the screened granular activated carbon material with water, the water is drained from the screened granular activated carbon material prior to drying.

8. The method of claim 1, wherein drying the screened granular activated carbon material in a heating oven comprises heating at 90° C. for about three hours, and then heating at 150° C. for about three hours.

9. The method of claim 1, wherein prior to further screening the dried granular activated carbon material, the dried granular activated carbon material is cooled to ambient temperature.

10. The method of claim 1, wherein adding the solution of chloroplatinic acid to the 4×6 US mesh granular activated carbon material comprises dripping the solution of chloroplatinic acid to the 4×6 US mesh granular activated carbon material.

11. The method of claim 1, wherein loading the container into the rotary evaporator comprises positioning a portion of the container in a hot water bath.

12. The method of claim 1, wherein rotating the rotary evaporator to remove water from the container comprises rotating the container for about five minutes while cooling water is turned on to condense water vapor.

13. The method of claim 1, wherein rotating the rotary evaporator to remove water from the container comprises turning on and providing a vacuum to the rotary evaporator.

14. The method of claim 1, wherein heating the 4×6 US mesh granular activated carbon material in the oven comprises heating in the oven at 250° C. for about four hours.

15. The method of claim 1 further comprising utilizing the produced platinum on the 4×6 US mesh granular activated carbon material catalyst composition as an ambient temperature catalytic oxidation catalyst composition in a trace contaminant control assembly to remove at least one contaminant from an environment.

16. The method of claim 15, wherein the at least one contaminant is hydrogen or carbon monoxide.

17. The method of claim 15, wherein the trace contaminant control assembly is an environmental control assembly for a space system.

18. An ambient temperature catalytic oxidation catalyst composition fabricated by the method of claim 1.

* * * * *